(12) United States Patent
Hahn et al.

(10) Patent No.: US 11,873,244 B2
(45) Date of Patent: Jan. 16, 2024

(54) GLARE-FREE GLASS ARTICLES AND METHOD FOR PRODUCING GLARE-FREE GLASS ARTICLES

(71) Applicant: SCHOTT AG, Mainz (DE)

(72) Inventors: Andreas Hahn, Hochstetten-Dhaun (DE); Yakup Gönüllü, Essenheim (DE); Eveline Rudigier-Voigt, Mainz (DE); Thorsten Damm, Eltville am Rhein (DE)

(73) Assignee: SCHOTT AG, Mainz (DE)

( * ) Notice: Subject to any disclaimer, the term of this patent is extended or adjusted under 35 U.S.C. 154(b) by 200 days.

(21) Appl. No.: 17/217,982

(22) Filed: Mar. 30, 2021

(65) Prior Publication Data

US 2021/0300816 A1    Sep. 30, 2021

(30) Foreign Application Priority Data

Mar. 30, 2020 (DE) ............. 10 2020 108 685.7

(51) Int. Cl.
*C03C 15/00* (2006.01)
*C03C 3/076* (2006.01)
(Continued)

(52) U.S. Cl.
CPC .............. *C03C 15/00* (2013.01); *C03C 3/076* (2013.01); *C03C 3/078* (2013.01); *C03C 3/083* (2013.01);
(Continued)

(58) Field of Classification Search
CPC ......... C03C 15/00; C03C 3/076; C03C 3/078; C03C 3/083; C03C 3/085; C03C 3/087; C03C 3/089; C03C 3/091
See application file for complete search history.

(56) References Cited

U.S. PATENT DOCUMENTS 8,598,771 B2    12/2013 Carlson
8,778,496 B2    7/2014 Hart
(Continued)

FOREIGN PATENT DOCUMENTS

CN            106517813           3/2017

OTHER PUBLICATIONS

Neilsen, "Some Illumination on the Mechanism of SIO$_2$ Etching in HF Solutions", J. Electrochem. Soc.: Solid-State Science and Technology, vol. 130, No. 3, Mar. 1983, pp. 708-712.
(Continued)

*Primary Examiner* — Alicia J Weydemeyer
*Assistant Examiner* — Laura B Figg
(74) *Attorney, Agent, or Firm* — Ruggiero McAllister & McMahon LLC (57) ABSTRACT

Glare-free glass articles and methods for producing are provided. The glass article includes a surface with an area having a roughness RMS from 10 nm to 1000 nm, a distinctness of image DOI from 30 to 70, a gloss value of less than 40 at a viewing angle of 60°, and a haze value, determined in transmission, of less than 3%. The area also has a ratio of mean height of peaks above core surface (Spk)

(Continued)

to mean depth of valleys below core surface (Svk) that is equal to 1±0.1 within a measured surface area of more than 0.1 mm² and less than 3 mm².

14 Claims, 3 Drawing Sheets

(51) Int. Cl.
    *C03C 3/078*     (2006.01)
    *C03C 3/091*     (2006.01)
    *C03C 3/085*     (2006.01)
    *C03C 3/087*     (2006.01)
    *C03C 3/089*     (2006.01)
    *C03C 3/083*     (2006.01)

(52) U.S. Cl.
    CPC .............. *C03C 3/085* (2013.01); *C03C 3/087* (2013.01); *C03C 3/089* (2013.01); *C03C 3/091* (2013.01)

(56) References Cited

U.S. PATENT DOCUMENTS

| | | |
|---|---|---|
| 9,446,979 B2 | 9/2016 | Lander |
| 2010/0246016 A1 | 9/2010 | Carlson |
| 2011/0062849 A1 | 3/2011 | Carlson |
| 2012/0134024 A1 | 5/2012 | Lander |
| 2019/0107751 A1* | 4/2019 | Bazemore ............... C03C 3/085 |
| 2019/0381811 A1* | 12/2019 | Masuda ............. B41J 11/00216 |

OTHER PUBLICATIONS

Arabatzis, "Photocatalytic, self-cleaning, antireflective coating for photovoltaic panels: Characterization and monitoring in real conditions", Solar Energy 159 (2018) 251-259.
Hein, "Lithography-free glass surface modification by self-masking during dry etching", Journal of Nanophotonics 051703-1 vol. 5, 2011, 14 pages.
Park, "A Review of Wet Chemical Etching of Glasses in Hydrofluoric Acid based Solution for Thin Film Silicon Solar Cell Application", Current Photovoltaic Research, 5(3) (2017), pp. 75-82.
Zhu, "Characterization of deep wet etching of fused silica glass for single cell and optical sensor deposition", J. Micromech. Microeng. 19 (2009) 065013 (8pp).
Bruns, "Deposition of abrasion resistant single films and antireflective coatings on sapphire", Surface & Coatings Technology 290 (2016) 10-15.
Zhang, "Fabrication of biomimetic high performance antireflective and antifogging film by spin-coating", Journal of Colloid and Interface Science 374 (2012) 89-95.
Cao, "Fabrication of high-performance antifogging and antireflective coatings using faujasitic nanozeolites", Microporous and Mesoporous Materials, 263 (2018) 62-70.

* cited by examiner

GLARE-FREE GLASS ARTICLES AND METHOD FOR PRODUCING GLARE-FREE GLASS ARTICLES

CROSS REFERENCE TO RELATED APPLICATIONS

This application claims benefit under 35 USC § 119 of German Application 10 2020 108 685.7 filed Mar. 30, 2020, the entire contents of which are incorporated herein by reference.

BACKGROUND

1. Field of the Invention

The invention generally relates to glass articles, preferably glare-free glass articles, and to a method for producing preferably glare-free glass articles.

2. Description of Related Art

For display applications, for example, surfaces are sought which exhibit lowest possible reflection of visible light. Often, anti-reflective coatings are used for this purpose.

For example, Cao et al. (Microporous and Mesoporous Materials 263 (2018), 62-70) describe a coating based on nanozeolites. The coating has antifogging properties and is also anti-reflective, i.e., reduces reflections. The coating is applied by dipping.

Zhang et al. (Journal of Colloid and Interface Science 374 (2012), 89-95) describe an antifogging film that is also designed to reduce reflection. The coating is applied by spin coating.

Arabatzis et al. (Solar Energy 159 (2018), 251-259) describe a photocatalytic self-cleaning and antireflective coating for photovoltaic applications.

Also, vapor deposition coating has been known for producing optical coatings on substrates.

Bruns et al. (Surface & Coatings Technology 290 (2016), 10-15) describe abrasion-resistant single films and antireflective coatings on sapphire that are produced by sputter deposition.

Chen et al. (Colloids and Surfaces A: Physicochem. Eng. Aspects 509 (2016), 149-157) describe the fabrication of antifogging, antireflective and self-cleaning transparent $SiO_2$ layers. Here, good results in terms of reduction of reflection are obtained with coating durations of 7.5 hours and 10 hours.

Thus, the coatings known from the prior art are designed in particular as antireflective coatings, although such a reduction in directional reflection is not or not necessarily associated with an increase in diffusely reflected light. Rather, the reduction in reflectivity is achieved by an increase in transmittance.

However, a drawback of such antireflective surfaces is that, when used in displays or screens, for example in e-book readers, smartphones, or tablet PCs, they are often subjected to abrasive loads which over time cause abrasion of the antireflective coatings.

It has also been found that, very often, the reduction in reflectivity associated with these antireflective coatings is not sufficient for the displayed content to be displayed in a clearly perceptible way. This is due to the fact that, although such an antireflective coating reduces reflection on a surface, this is however achieved through increased transmittance. Such antireflective effects often depend on the wavelength and angle of incidence. However, if reflection occurs, for example at a shallow light incidence angle, this reflection can still be disturbing, i.e., dazzling.

Surfaces known as glare-free are of advantage here. Such glare-free surfaces are surfaces in which the directed or specular reflection of a surface is reduced by increasing diffuse reflection.

The term "glare-free surfaces" commonly refers to matted surfaces. This is a surface that reflects incident light not specularly or at least not entirely specularly, but diffusely. Generally, glare-free surfaces can also be described as matt or non-glossy. Such surfaces are often also referred to as "anti-glare" surfaces.

Such glare-free surfaces are of great importance, for example for display applications. If a cover sheet of a display is designed to be glare-free, this increases the visibility of the content presented on the display. Therefore, such glare-free surfaces are of importance for electronic devices such as e-book readers, smartphones, or computers.

Furthermore, it has also been known from the prior art that a surface texture can increase the mattness of a surface.

For example, U.S. patent application US 2010/0246016 A1 discloses a glass article having an anti-glare surface. This surface has a DOI of less than 95 and a haze of less than or equal to 50%. This is achieved by a method in which, first, crystals are grown on a surface of the article, followed by wet chemical etching, the etching being performed around the crystals, and subsequently the crystals are removed to form an anti-glare surface.

U.S. patent application US 2012/0134024 A1 discloses a surface treatment for producing an anti-glare surface and articles produced by such treatment. The surface treatment comprises depositing deformable particles on at least a portion of at least one glass surface. The deformable particles are then caused to deform so as to adhere to the glass surface, and then an etching step is performed thereby etching the areas of the glass surface not covered by the particles. The etching may in particular be performed using a conventional glass etching process.

Such conventional methods of etching glass involve the use of HF or of aqueous solutions comprising HF.

An overview of wet chemical etching of glass for applications in the field of thin-film silicon solar cells is provided, for example, by Park et al. (Current Photovoltaic Research 5 (3), 2017, 75-82). Park et al. describe in particular that the etching rate for HF-containing buffer solutions is higher than for pure HF.

Wet chemical etching leads to the formation of spherical structures which can also be described as approximately spherical or dome-shaped bulges in the glass surface. Park et al. describe this phenomenon as well.

The mechanism of etching $SiO_2$ by HF or HF-containing solutions is also discussed by Nielsen et al. (J. Electrochem. Soc.: Solid State Science and Technology, 130 (1983) 708-711, and by Zhu et al. (Journal of Micromechanics and Microengineering, 19 (2009), Characterization of deep wet etching of fused silica glass for single cell and optical sensor deposition).

Wet chemical etching processes for glass surfaces not only have to be performed with substances that are critical from a health and environmental point of view and therefore undesirable, but also imply excessive processing durations.

Plasma etching of glass surfaces is discussed by Hein et al. (Journal of Nanophotonics, 5 (2011), Lithography-free glass surface modification by self-masking during dry etching).

However, plasma etching is also a process with long processing durations. Furthermore, it also requires masking. Typically, lithography processes are used for this purpose, in which etching masks have to be applied in complex processes. Such processes are not only complex, but also costly.

Mechanical methods for texturing surfaces are known as well, for example sandblasting. Although such processes can be performed quickly, they may lead to a significant reduction in the strength of, for example, a glass sheet. Moreover, such methods often have the drawback that the produced surface textures are irregular, that is, for example, linear surface textures are produced.

Furthermore, the possibility is known of performing reactive ion beam etching in which masking occurs through self-organization, so that lithography processes can be dispensed with. In this case, particle clusters adhering to the surface are generated on the surface to be etched. However, the surfaces produced with such a process are inadequate in terms of their optical properties, in particular in terms of the mattness produced.

Glass articles with glare-free surfaces are also known from the prior art.

U.S. Pat. No. 8,778,496 B2 describes a chemically strengthened glass sheet including a first side with a first low roughness and a second side with a first higher roughness. The two sides of the sheet have substantially the same compressive stress values. It is in particular disclosed that the roughening can be achieved by wet chemical etching.

U.S. Pat. No. 8,598,771 B2 discloses a glass article that has at least one roughened surface, the glass article having a DOI of less than 90 and a transmission haze of less than 40%. The glass article may be accessible to ion exchange or may else already be provided in an ion-exchanged form, i.e., chemically toughened. The roughening of the surface of the glass article is achieved by wet chemical etching.

U.S. Pat. No. 9,446,979 B2 also discloses the implementation of a glass article that has at least one anti-glare surface.

Thus, glass articles with glare-free surfaces require complex manufacturing processes for their fabrication, which often involve the use of agents that are hazardous to health and environmentally questionable, such as HF, and/or can only be produced in lengthy processes. However, the surfaces obtained are not sufficiently matt in order to ensure satisfactory freedom from glare.

Therefore, there is a need for glass articles with glare-free surfaces, which at least mitigate the aforementioned deficiencies of the prior art, and for a method for making such articles.

SUMMARY

The object of the invention is to provide glass articles that preferably have at least one glare-free surface, and which at least mitigate the deficiencies of the prior art mentioned above, and a method for producing such articles.

In the context of the present document, glare-free surface is understood to mean a surface with reduced directional reflection and increased diffuse, undirected and/or scattered reflection in at least one area of the surface. The term "glare-free" should therefore not be understood to mean a surface that no longer causes reflection. Rather, the terms "glare-free" and "anti-glare" are to be understood as synonyms. Therefore, in the context of the present document, glare-free surface should be understood as a surface that at least reduces glare.

The surface quality can be expressed as a DOI (distinctness of image) value of the surface. In the present case, the DOI value is used to describe the quality of the reflection of the respective reflective surface, i.e., the degree of distortion of a reflected image. A low DOI value indicates a high degree of distortion, while a high DOI value indicates a clear undistorted reflection.

For determining the DOI, the reflected image created on the surface of the sample is compared with the image created on a reference surface (typically polished black glass). As a rule, the reference surface is particularly smooth and therefore ideally exhibits distortion-free reflection. In the measurement setup used herein, the reflected image of a linear light source is observed, and the intensity distribution is assessed in comparison to the reference. The measured value is given as the ratio of the intensity of the sample at a certain angle of reflection to the maximum intensity of the sample.

In fact, it is in particular the overall intensity distribution of the reflected light that is the most meaningful indication of the anti-glare effect or freedom from glare of a surface. However, in order to obtain a parameter that can be evaluated and/or represented, it may be advisable to choose, as the measurement angle, twice the angle at which the reference curve falls to 1% of its maximum intensity. This has the advantage that in this way a value is obtained which, regardless of the absolute intensity, represents very well the specularly reflected portion and hence regards the value which is considered to be most disturbing for a viewer of the surface. This is an aspect that is not represented in other measurements, for example when determining the gloss value. The measurement procedure described therefore allows to metrologically capture the visible effect that surfaces with the same gloss values produce different degrees of dazzle when viewed.

Sparkle of a display refers to a type of noise in the visual appearance of a display. This noise shows up as an irregular pattern of various small dots of different colors on a display. In the context of the present document, sparkle is also referred to as "glitter" or "iridescence" of a display and is specified for a display with a resolution of 190 DPI.

The sparkle is measured using the SMS1000 test device from DM&S.

Measurement method: A first image of the measurement object (combination of display and anti-glare texture) is taken and recorded using a camera. The anti-glare texture is slightly laterally shifted, and a second image is taken. The sparkle is assessed by comparing the two images by subtracting them from each other and then dividing the standard deviation of the gray levels by the mean gray value of the reference measurement (same procedure without anti-glare texture).

Another option for describing the surface properties of an article is to specify its gloss value. The gloss value describes the degree to which the surface of a body reflects light specularly.

A body is said to be cloudy or hazy when light is scattered when being transmitted through the body. For example, hazy articles such as hazy glass may have a milky appearance. The degree of cloudiness in the transmission of light is often indicated by specifying the haze value. The greater this figure, the more hazy the body is. For example, when articles are arranged behind a cloudy glass sheet, they cannot be perceived clearly, but only blurred.

A parameter for describing the exact shape of the surface topography, which is, for example, specified in ISO 25178, in particular of the height distribution of a surface topography, is known as "skewness" or asymmetry of the surface area, also referred to as Ssk, for short. The skewness or asymmetry value, Ssk, is calculated using the following formula:

$$Ssk = \frac{1}{S_q^3} \frac{1}{A} \int \int_A (Z(x, y)^3) dx dy.$$

Here, Sq is the root mean square of the height, which is calculated using the following formula:

$$Sq = \sqrt{\frac{1}{A} \int \int_A Z^2(x, y) dx dy}.$$

A is the surface area of the measured portion, x and y are the area coordinates of the area under consideration (measured area), and z is the height. The skewness (or asymmetry) Ssk indicates the degree of symmetry in the distribution of surface heights around the mean height. It can therefore be understood as a measure of whether "valleys", i.e., depressions, or peaks dominate in a surface topography. If peaks and valleys are evenly distributed, the Ssk value assumes the value of 0. In the case of a surface that predominantly has depressions, Ssk takes a negative value. If elevations predominate, the Ssk will be positive, i.e., have a value greater than 0.

Two further helpful parameters for describing the topography are the parameters Spk and Svk as specified in ISO 25178. The parameter Spk stands for the mean height of the peaks above the core surface (reduced peak height). Similarly, the reduced valley height, Svk, stands for the mean depth of the valleys below the core surface. For a symmetrical surface topography, Spk≈Svk, i.e., Spk/Svk≈1.

Finally, the parameter Sdq (root mean square gradient of the surface) represents the root mean square value of the slope of the surface or surface profile at all points in the measurement area. The Sdq value of a completely plane surface is 0.

In the context of the present document, topography of a surface is understood to mean the description of the surface in terms of its geometric texture.

The present document relates to a sheet-like glass article comprising at least one surface which includes at least one area with a roughness RMS from 10 nm to 1000 nm, preferably a DOI from 30 to 70, a gloss value of less than 40 at a viewing angle of 60°, wherein the glass article, measured in a portion which includes the area of the at least one surface, has a haze value, determined in transmission, of less than 3%, wherein preferably, the ratio of Spk to Svk as determined for the at least one area of the at least one surface is equal to 1±0.1 within a measured surface area of more than 0.1 mm² and less than 3 mm².

Alternatively or additionally, the glass article according to one embodiment can be designed such that the Ssk value as determined for the at least one area of the at least one surface of the glass article is greater than 0, preferably determined within a measured area of more than 0.1 mm² and less than 3 mm².

Alternatively or additionally, the glass articles according to one embodiment can be designed such that the root mean square gradient value, Sdq, of the at least one area of the at least one surface is at least 50 µm/mm, preferably at least 75 µm/mm over a surface area of 0.33 mm*0.33 mm, and/or is at least 70 µm/mm, preferably at least 90 µm/mm and most preferably at least 100 µm/mm over a surface area of 1.6 mm*1.6 mm.

In each case, the measured surface on which the respective parameters for characterizing the surface topography are determined is included in the at least one area of the at least one glass surface, that is to say it is a partial area of the at least one area.

In the context of the present disclosure, the gloss value (or gloss, for short) is given in so-called gloss units (GU).

The parameters mentioned for determining or characterizing the surface topography can be obtained by simply measuring the surface texture, for example by white light interferometry.

Area of at least one surface is understood to mean that not the entire surface or main surface of a glass article need to have the properties mentioned, rather these properties may possibly only be provided in a smaller part of the surface. For example, it is possible to mask the at least one surface so that not the entire surface will have the surface texture discussed, such as a specific surface relief, and the resulting properties, for example optical properties. However, it is also possible and may even be preferred that the at least one surface exhibits the special surface properties according to the present disclosure over the entire surface area thereof.

The at least one area of the surface of the glass article furthermore defines a portion of the glass article, namely that portion of the glass article in which the surface has the special surface texture or surface topography with the properties resulting therefrom.

In the context of the present disclosure, segment refers to a portion of the at least one area of the surface. In other words, a segment is always smaller than an area. Segments usually have lateral dimensions of not more than a few millimeters. However, usually and in particular also preferably, the segments are smaller in the present context and preferably have lateral dimensions of less than one millimeter, for example 100 µm or less, even only 1 µm, for example. Areas in particular have lateral dimensions of at least some millimeters, more particularly of at least one centimeter.

A glass article is referred to as sheet-like in the present context, if its lateral dimensions in one direction of a Cartesian coordinate system are at least one order of magnitude smaller than in the two other spatial directions perpendicular to this first spatial direction. This first spatial direction is usually also referred to as the thickness, the other two spatial directions are referred to as the length and width. Thus, the thickness of a sheet-like glass article is in particular at least one order of magnitude smaller than the length and width of the sheet-like glass article. Length and width can be of the same order of magnitude. However, it is also possible and may even be preferred that the length of the glass article is significantly greater than the width of the glass article. In this case, the sheet-like glass article may also be referred to as a ribbon.

The two lateral dimensions perpendicular to the first, smallest lateral dimension, define the two principal surfaces of the sheet-like glass article. In the context of the present document, these two principal surfaces are also referred to as main faces, main surfaces, and/or surfaces of the sheet-like glass article.

The sheet-like glass article of the present document may be either flat or curved, for example uniaxially or biaxially deformed.

An embodiment of a sheet-like glass article has a number of advantages.

With an implementation of at least one area of at least one surface with a roughness RMS from 10 nm to 1000 nm, a DOI from 30 to 70, a gloss value of less than 40 at a viewing angle of 60°, and with the glass article, when measured in a portion which includes the area of the at least one surface, having a haze value, determined in transmission, of less than 3%, the glass article will be a glare-free glass article or at least a glass article with reduced glare.

The gloss value is determined by measuring at an angle of 60°, here.

Gloss value and DOI describe respective different aspects of surface quality. The at least one surface of the glass article according to the present document is preferably provided as a surface of reduced gloss here, that is to say it exhibits medium gloss. However, the reflected image is not scattered specularly, rather the reflection of the light incident on the at least one surface is diffuse to a certain extent. The DOI value can be considered as a measure for this, it describes to what degree a reflection is directed, i.e., specular, or undirected, i.e., diffuse.

When the sheet-like glass article is used in a display, for example, this has the advantage for the user of this display that he or she will be able to perceive the display content better than in the case of a non-treated glass article or a glass article provided with an anti-reflective coating. In particular, the user or viewer of the display will no longer be dazzled, or at least only slightly.

The advantageous optical properties of the glass article are achieved through targeted adjustment of the surface roughness in the at least one area of the at least one surface. The at least one surface has a roughness RMS between 10 nm and 1000 nm in the at least one area.

It has been found that particularly good optical properties, that is particularly good freedom from glare is achieved by a specifically adjusted surface topography in at least one area of the at least one surface of the glass article.

Such a surface topography is provided when, for example, the ratio of Spk to Svk in the at least one area of the at least one surface is equal to 1±0.1 within a measured surface area of more than 0.1 mm$^2$ and less than 3 mm$^2$.

Alternatively or additionally, the glass article according to one embodiment may be designed such that the Ssk value of the at least one surface of the glass article is greater than 0 in the at least one area, preferably considered within a measured surface area of more than 0.1 mm$^2$ and less than 3 mm$^2$.

Alternatively or additionally, the glass articles according to one embodiment may be designed such that the root mean square gradient value, Sdq, of the at least one area of the at least one surface is at least 50 μm/mm, preferably at least 75 μm/mm over a surface area of 0.33 mm*0.33 mm, and/or is at least 70 μm/mm, preferably at least 90 μm/mm and most preferably at least 100 μm/mm over a surface area of 1.6 mm*1.6 mm.

Particularly good properties are achieved when the surface topography of the at least one surface is adjusted such that the skewness or asymmetry, Ssk, of the at least one area of the surface assumes a value of greater than 0, preferably of more than 1, and at the same time the ratio of Spk to Svk in the at least one area of the at least one surface is equal to 1±0.1 within a measured surface area of more than 0.1 mm$^2$ and less than 3 mm$^2$. In this case, the surface topography is dominated by elevations, or peaks, and the peaks and valleys each have a similar absolute dimension. Such a surface topography in the at least one area of the at least one surface with a ratio of Spk to Svk equal to 1±0.1 within a measured surface area of more than 0.1 mm$^2$ and less than 3 mm$^2$ is also referred to as "well balanced" in the context of the present document.

Such surface topographies in the at least one area of the at least one surface of embodiments of the glass article are particularly advantageous because they provide for particularly efficient scattering on the texture in the at least one area of the at least one surface. Hitherto, with the prior art matt surfaces, this has not been possible. This is due to the fact that these surfaces are in particular obtained by wet chemical etching. As described by Park et al., for example, the wet chemical etching results in the formation of relatively large, more or less circular indentations in the glass surface. Although these textures cause scattering, such scattering does not suffice to bring about a sufficient reduction in glare.

The inventors have found that such a sufficient reduction can be achieved surprisingly easily, preferably with a surface having a surface topography in correspondence to embodiments of the glass article.

In order to ensure that the display content can be displayed, the glass article should exhibit the lowest possible haze. The haze value is therefore limited. Therefore, despite the at least one glare-free or anti-glare surface in the at least one area of the at least one surface of the sheet-like glass article, an item or lettering arranged behind the glass article according to the present document or behind the at least one area of the surface of the glass article or glass articles is easily perceptible by a viewer. In the context of the present disclosure, the haze value is preferably determined in compliance with or based on the ASTM D 1003 standard.

According to one embodiment of the glass article, sparkle as determined for a display with 190 DPI is less than 0.1, preferably at most 0.09 or less.

As already mentioned above, sparkle (which may also be referred to as glitter or iridescence) is an effect that often occurs especially on surfaces that are designed to be glare-free or at least to reduce glare. This effect is in particular also known from screen protector films that have an anti-glare effect. The viewer perceives irregular patterns in the form of differently colored small dots. Since this reduces the perception of displayed content, sparkle should be limited. Advantageously, it is less than 0.1, preferably at most 0.09 or less, determined for a display with a resolution of 190 DPI. Sparkle can be determined using the SMS1000 test device from DM&S and is measured with this device.

The measurement method is as follows: A first image of the measurement object (combination of display and anti-glare texture) is taken and recorded using a camera. The anti-glare texture is slightly shifted laterally, and a second image is taken. The sparkle is assessed by comparing the two images by subtracting them from each other and then dividing the standard deviation of the gray levels by the mean gray value of the reference measurement (same procedure without anti-glare texture). The images are each captured in the at least one area in which the at least one surface of the glass article has the respective surface topography.

Here, anti-glare texture refers in particular to a glass article according to embodiments of the present document. In the context of the present disclosure, anti-glare texture in particular also refers to a glare-free surface of an article, in particular including a glass article according to embodiments.

According to a further embodiment of the glass article, the glass article is toughened, preferably chemically toughened. Toughening of the glass article advantageously increases user safety. The toughening enhances the strength of the glass article so that it will break less easily. Moreover, in the event of failure, i.e., when the glass article breaks, the toughening often implies that no large fragments are obtained, but rather the fracture pattern is as fine-crumbled as possible. This additionally reduces the risk of injury for the user.

The glass article preferably has a thickness between 0.1 mm and 8 mm.

According to a further embodiment of the glass article, the glass article comprises the following constituents, in wt %:
$SiO_2$ 50 to 80,
$Al_2O_3$ 0 to 30,
$B_2O_3$ 0 to 20,
$Li_2O$ 0 to 15,
$Na_2O$ 0 to 20,
$K_2O$ 0 to 20,
CaO 0 to 15,
BaO 0 to 10.

Furthermore, the inventors have found that a sheet-like glass article which is designed so that glare is at least reduced in at least one area can be obtained in a surprisingly simple way by a method which comprises a plasma etching step.

The method for producing a sheet-like glass article that has at least one surface which includes at least one area with a roughness RMS from 10 nm to 1000 nm, preferably with a DOI from 30 to 70, a gloss value of less than 40 at a viewing angle of 60°, which glass article, when measured in a portion which includes the area of the at least one surface, has a haze value, determined in transmission, of less than 3%, wherein, preferably, the ratio of Spk to Svk, determined for the at least one area of the at least one surface is equal to 1±0.1 within a measured surface area of more than 0.1 mm$^2$ and less than 3 mm$^2$, and/or wherein, preferably, the Ssk value of the at least one area of the at least one surface of the glass article is greater than 0, preferably determined within a measured surface area of more than 0.1 mm$^2$ and less than 3 mm$^2$, and/or wherein, preferably, the root mean square gradient value, Sdq, of the at least one area of the at least one surface is at least 50 µm/mm, preferably at least 75 µm/mm over a surface area of 0.33 mm*0.33 mm, and/or is at least 70 µm/mm, preferably at least 90 µm/mm, and most preferably at least 100 µm/mm over a surface area of 1.6 mm*1.6 mm, comprises the following steps: Cleaning of at least one surface of the glass article.

Prior to the plasma treatment, the at least one surface of the glass article to be treated has to be cleaned. Any contamination and/or any surface covering such as dirt, fragments, oil, and/or fingerprints will have an effect similar to a mask and/or will alter the erosion rate of the surface in the etching process. The cleaning step is therefore necessary in order to obtain a uniform surface texture in the further process.

The cleaning of the at least one surface may be effected by cleaning processes commonly used in surface technology, which are known to a person skilled in the art of surface and/or coating technology.

Hydrophobizing of at least one area of the at least one surface of the glass article by applying thereto, by spraying, a hydrophobizing liquid, so that after the hydrophobizing at least the area of the at least one surface has a contact angle of more than 90°.

Without additional pre-treatment, glass surfaces are usually intrinsically hydrophilic. This means that the surfaces can be easily wetted with water and/or aqueous and/or polar liquids. By contrast, there are surfaces which are made hydrophobic, that is they cannot be wetted or only slightly wetted with water and/or aqueous and/or polar liquids.

If a masking liquid were applied onto a hydrophilic surface, this would result in the formation of droplets with a very large diameter of 1 mm or even more, due to the good wetting. This would prevent uniform masking. In particular, rather large areas would result which would not or only very slightly be attacked in an etching step following the masking, and would therefore be essentially smooth. A uniform, visually inconspicuous and in particular sufficient reduction in glare would not be achieved in this way.

Masking at least the at least one area of the at least one surface of the glass article by applying thereto, by spraying, a solution of a surface-active agent, so that droplets of the solution of the surfactant that are resulting at least in the one area of the at least one surface have a mean diameter between at least 1 µm and at most 100 µm.

The third step eventually comprises the masking. Here, masking is understood to mean that part of the surface to be plasma treated is treated, in particular coated, such that no or only reduced surface attack and/or surface erosion will be caused in the masked segments of the surface during the plasma treatment of the surface compared to non-masked segments.

The masking solution that is used is a solution of a surface-active agent. Such a surface-active agent is also referred to as a surfactant (short for "SURFace-ACTive AgeNT") in the English language, and generally is a compound that lowers the surface tension of a liquid or the interfacial tension between two phases.

The spray parameters are set such that the droplet size, indicated as the diameter of the particles in the at least one area of the at least one surface that is coated with the masking solution, is between 1 µm and 100 µm. The spraying may be performed using a simple hand spray nozzle, or in automated manner.

In other words, the masking step produces segments (or partial areas) with a diameter between 1 µm and 100 µm (depending on the spray parameters used) on the at least one surface in the at least one area, where the plasma etching rate will be at least reduced in comparison to the non-covered segments of the at least one area of the at least one surface located between these segments, in particular due to the covering of these segments by a masking compound. The covered segments can be descriptively referred to as "islands".

Etching of the at least one area of the at least one surface of the glass article by a plasma process using a fluorine-containing reactive gas.

Finally, a further step comprises the etching of the at least one surface of the glass article covered with a masking layer in at least one area thereof. The etching is performed by a plasma process using a fluorine-containing reactive gas, and, in principle, any fluorine-containing reactive gas can be used for this purpose.

In the context of the present document, etching is understood to mean a surface erosion process based on chemical reactions.

The advantage of such an etching process, that is, a plasma-etching process, over the prior art wet-chemical etching processes is that the reactive gases that are used are generally less concerning, especially in terms of occupational health and safety, than the fluorine-containing liquids and solutions that are used for the wet-chemical etching process of glass articles.

It has been found, surprisingly, that a method as described above allows to obtain a surface texture that is particularly advantageous with regard to a reduction in glare. In particular, substantially no spherical dome-shaped surface textures are obtained. Conventional wet-chemically etched glass surfaces usually have such more or less spherical texture features, which usually have a diameter between 1 µm and 50 µm. However, such texture features are not obtained with the method according to the present document.

Rather, the surface topography that is obtained with the method according to the present document can be characterized as follows:

The length of the obtained texture features varied as a function of the exact etching time and was between 1 µm and up to 1000 µm.

According to one embodiment of the method, the hydrophobizing liquid comprises an alkyl perfluorocarbon silane of the formula $(Rf)_xSiX_{4-x}$, where Rf is a linear $C_6$ to $C_{30}$ alkyl perfluorocarbon and X is Cl or —$OCH_3$, and x assumes values between 2 and 4, or a fluoroalkyl oligosiloxane, preferably a fluoroalkyl siloxane, more preferably a fluoroalkyl oligosiloxane, and most preferably an ethanolic solution of a fluoroalkyl oligosiloxane, with a concentration of the fluoroalkyl oligosiloxane of preferably at least 0.25 wt % based on the total weight of the solution.

According to this embodiment, the hydrophobizing liquid may in particular even consist of an alkyl perfluorocarbon silane of the formula $(Rf)_xSiX_{4-x}$, where Rf is a linear $C_6$ to $C_{30}$ alkyl perfluorocarbon and X is Cl or —$OCH_3$, and x assumes values between 2 and 4, or of a fluoroalkyl oligosiloxane, preferably of an alkyl perfluorocarbon silane or more preferably of a fluoroalkyl oligosiloxane, or the hydrophobizing liquid may be a solution of an alkyl perfluorocarbon silane of the formula $(Rf)_xSiX_{4-x}$, where Rf is a linear $C_6$ to $C_{30}$ alkyl perfluorocarbon and X is Cl or —$OCH_3$, and x assumes values between 2 and 4, or of a fluoroalkyl oligosiloxane, preferably a solution of a fluoroalkyl siloxane, most preferably of a fluoroalkyl oligosiloxane. Most preferably, the hydrophobizing liquid is an ethanolic solution of such a silane and/or siloxane.

Most preferably, an ethanolic solution of a fluoroalkyl oligosiloxane is used as the hydrophobizing liquid, with a concentration of the fluoroalkyl oligosiloxane of preferably at least 0.1 wt % based on the total weight of the solution.

Alternatively, the surface can be treated under vacuum at a pressure of less than 30 mbar using an alkyl perfluorocarbon silane of the formula $(Rf)_xSiX_{4-x}$, where Rf is a linear $C_6$ to $C_{30}$ alkyl perfluorocarbon and X is Cl or —$OCH_3$, and x assumes values between 2 and 4, or using a fluoroalkyl oligosiloxane, in which case the alkyl perfluorocarbon silane of the formula $(Rf)_xSiX_{4-x}$, where Rf is a linear $C_6$ to $C_{30}$ alkyl perfluorocarbon and X is Cl or —$OCH_3$, and x assumes values between 2 and 4, or the fluoroalkyl oligosiloxane will sublime and can thus become deposited on the surface to be treated.

For example, a product from Evonik, marketed under the trade name Dynasylan F 8815, can be used as the fluoroalkyl oligosiloxane. For example, the commercially available product Dynasylan F 8815 can be used directly, or it can be diluted with ethanol, namely 1 g of fluoroalkyl oligosiloxane in 395 g of ethanol, so that a 0.25 wt % solution is obtained.

According to a further embodiment of the method, a solution of an anionic surfactant in ethanol and/or in one or more glycol ethers of the general formula $C_xH_yO_z$ with x greater than or equal to 3 but not more than 10, y greater than or equal to 8 but not more than 22, and z greater than or equal to 2 but not more than 5 is used, preferably with a concentration of the anionic surfactant of at least 5 wt % and at most 20 wt %, based on the total weight of the solution.

Glycol ethers are a group of organic substances with ethylene glycol or diethylene glycol as a structural unit. A person skilled in the art will know common glycol ethers and will select them depending on the desired properties of the solvent. It is also possible, for example, to use a commercially available cleaning solution as the anionic surfactant.

It is in particular possible and may be preferred, that the concentration of the surfactant in the masking solution is between 1% and 9%, preferably exactly 5 wt %, based on the total weight of the solution. Such a concentration provides adequate masking and thus a reduction in the erosion rate in the areas covered by the masking during the etching process compared to the non-covered areas. At the same time, such a low concentration is more cost-effective than higher concentrations of a surfactant.

According to yet another embodiment of the method, the plasma etching is accomplished using $CF_4$, $CHF_3$, $C_4F_8$, and/or $SF_6$ as the reactive gas, and/or in a microwave plasma or in an RF plasma or by reactive ion beam etching.

It has been found that $CF_4$, $CHF_3$, $C_4F_8$, and/or $SF_6$ can be used as a reactive gas during acceptable, relatively short processing times compared to conventional etching processes, in particular wet chemical etching processes. At the same time, these gases are significantly less critical in terms of occupational health and safety as well as environmental protection aspects than substances used in wet chemical processes, such as HF.

The erosion (or etching) method according to the present document is performed in a plasma which may be a microwave plasma or an RF plasma, for example. It is also possible to perform reactive ion beam etching.

According to a preferred embodiment of the method, the reactive gas is $CF_4$ and the plasma etching is performed in a microwave plasma at a pressure of 10 mbar or in an RF plasma at a pressure of 0.5 mbar.

A method according to embodiments in particular allows or has allowed to produce a glass article that has at least one surface which includes at least one area with a roughness RMS from 10 nm to 1000 nm, preferably with a DOI from 30 to 70, a gloss value of less than 40 at a viewing angle of 60°, which glass article, when measured in the at least one area has a haze value, determined in transmission, of less than 3%, wherein, preferably, the ratio of Spk to Svk, determined for the at least one area of the at least one surface is equal to 1±0.1 within a measured surface area of more than $0.1$ mm$^2$ and less than 3 mm$^2$, and/or wherein, preferably, the Ssk value of the at least one area of the surface of the glass article is greater than 0, preferably considered within a measured surface area of more than 0.1 mm$^2$ and less than 3 mm$^2$, and/or wherein, preferably, the root mean square gradient value, Sdq, of the at least one area of the at least one surface is at least 50 µm/mm, preferably at least 75 µm/mm over a surface area of 0.33 mm*0.33 mm, and/or is at least 70 µm/mm, preferably at least 90 µm/mm, and most preferably at least 100 µm/mm over a surface area of 1.6 mm*1.6 mm.

DETAILED DESCRIPTION

The invention will now be further discussed by way of examples.

Example 1

A glass article comprising aluminosilicate glass as commercially available under the designation AS 87 was first cleaned in an industrial dishwasher in order to clean the surfaces of the glass article from dirt such as grease, fingerprints, or the like. Then, a 0.25 wt % solution of a modified fluoroalkyl oligosiloxane in ethanol (1 g of fluoroalkyl oligosiloxane in 395 g of ethanol) was applied over the entire surface of the glass article. In this way, a surface of the glass article was made hydrophobic. More generally, without being limited to the example specifically described here, it is also possible that only an area of the at least one surface of the glass article is made hydrophobic, for example by covering the area or areas of the at least one surface, which are not intended to be hydrophobized. Subsequently, a 5% solution of a surfactant in ethanol and a mixture of different glycol ethers was applied to the hydrophobized surface of the glass article by spraying. Then, plasma etching was performed in a $CF_4$-containing atmosphere in a microwave plasma at a pressure of 10 mbar.

Example 2

A glass article comprising a lithium aluminum silicate glass as commercially available under the designation LAS 80 was first cleaned in an industrial dishwasher in order to clean the surfaces of the glass article from dirt such as grease, fingerprints, or the like. Then, a 0.25 wt % solution of a modified fluoroalkyl oligosiloxane in ethanol (1 g of fluoroalkyl oligosiloxane in 395 g of ethanol) was applied over the entire surface of the glass article. In this way, a surface of the glass article was made hydrophobic. Subsequently, a 5% solution of a surfactant in ethanol and a mixture of different glycol ethers was applied to the hydrophobized surface of the glass article by spraying. Then, plasma etching was performed in a $CF_4$-containing atmosphere in a microwave plasma at a pressure of 10 mbar.

Again, it is generally possible here that the at least one surface is not hydrophobized over its entire surface area, but only in an area of the surface.

Example 3

A glass article comprising aluminosilicate glass as commercially available under the designation AS 87 was first cleaned in an industrial dishwasher in order to clean the surfaces of the glass article from dirt such as grease, fingerprints, or the like. Then, a 0.25 wt % solution of a modified fluoroalkyl oligosiloxane in ethanol (1 g of fluoroalkyl oligosiloxane in 395 g of ethanol) was applied over the entire surface of the glass article. In this way, a surface of the glass article was made hydrophobic. Subsequently, a 5% solution of a surfactant in ethanol and a mixture of different glycol ethers was applied to the hydrophobized surface of the glass article by spraying. Then, plasma etching was performed in a $CF_4$-containing atmosphere in an RF plasma at a pressure of 0.5 mbar.

Again, it is generally possible here that the at least one surface is not hydrophobized over its entire surface area, but only in an area of the surface.

Example 4

A glass article comprising a lithium aluminum silicate glass as commercially available under the designation LAS 80 was first cleaned in an industrial dishwasher in order to clean the surfaces of the glass article from dirt such as grease, fingerprints, or the like. Then, a 0.25 wt % solution of a modified fluoroalkyl oligosiloxane in ethanol (1 g of fluoroalkyl oligosiloxane in 395 g of ethanol) was applied over the entire surface of the glass article. In this way, a surface of the glass article was made hydrophobic. Subsequently, a 5% solution of a surfactant in ethanol and a mixture of different glycol ethers was applied to the hydrophobized surface of the glass article by spraying. Then, plasma etching was performed in a $CF_4$-containing atmosphere in an RF plasma at a pressure of 0.5 mbar.

Again, it is generally possible here that the at least one surface is not hydrophobized over its entire surface area, but only in an area of the surface.

Example 5

A glass article comprising a lithium aluminum silicate glass as commercially available under the designation LAS 80 was first cleaned in an industrial dishwasher in order to clean the surfaces of the glass article from dirt such as grease, fingerprints, or the like. Then, 1 ml of alkyl perfluorocarbon silane (e.g. trichloro(1H,1H,2H,2H-perfluorooctyl)silane) was applied. In this way, a surface of the glass article was made hydrophobic over the entire surface area. Subsequently, a solution of a surfactant in ethanol and a mixture of different glycol ethers was applied to the hydrophobized surface of the glass article by spraying. Then, plasma etching was performed in a $CF_4$-containing atmosphere in an RF plasma at a pressure of 0.5 mbar.

Again, it is generally possible here, that the at least one surface is not hydrophobized over its entire surface area, but only in an area of the surface.

Figure 1A:
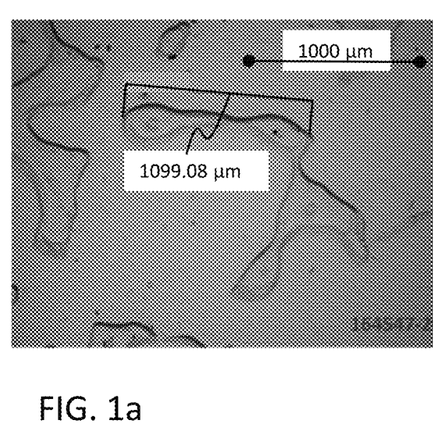
FIGS. 1a and 1b show photographs of the surfaces of glass articles that have been masked.

FIG. 1a shows the photograph of a surface of a glass article that has been masked without previously having been hydrophobized. When a masking solution is applied, a few relatively large "islands" are resulting, with an average diameter of more than 1 mm, and adjacent thereto relatively large non-covered surface areas. This does not allow to achieve a visually inconspicuous uniform matting of a surface of a glass article, which would result in a reduction in glare of a display.

For identification of the dimensions, the scale labeled 1000 mm is indicated in the upper right corner of FIG. 1a, and the diameter of 1099.08 μm of one "island" is also indicated.

Figure 1B:
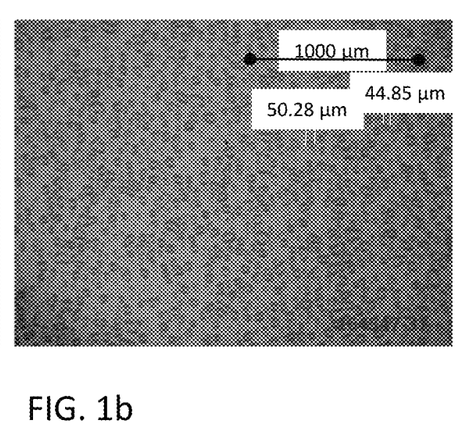

FIG. 1b, by contrast, is a photograph that shows of a surface of a glass article which was masked only after having been hydrophobized. In this way, a uniform distribution of the masking liquid or masking solution is obtained in the form of droplets with a diameter between 1 μm and 100 μm, depending on the precise spray parameters selected.

Here, two diameters of such finer applied texture features are indicated, next to the scale, in the upper right corner of FIG. 1B.

Figure 2A:
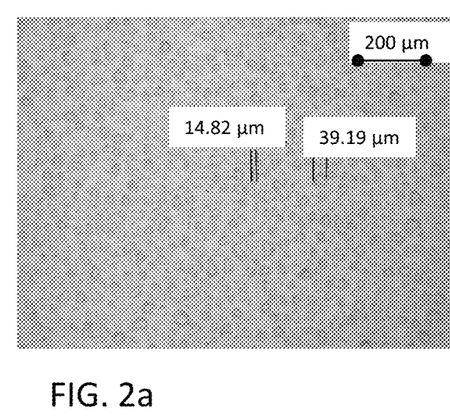
FIGS. 2a and 2b show photographs of hydrophobized and then masked surfaces of glass articles.
Figure 2B:
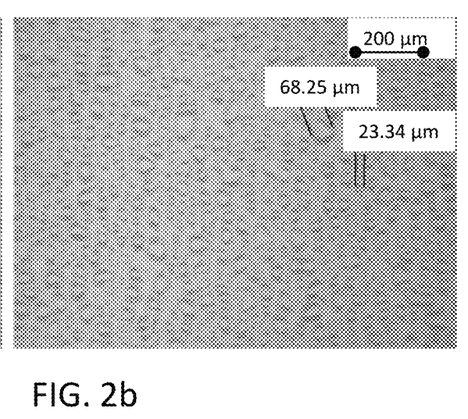

FIGS. 2a and 2b show the photographs of surfaces of glass articles which were masked after having been hydrophobized in each case. The masking shown in FIG. 2a was obtained using a hand spray gun, and the masking shown in FIG. 2b was obtained using an automatic spraying system. As can be seen, both the manual spray application and the automated spraying process in a spray-coating system lead to an even distribution of the masking solution in the form of small droplets with a diameter between 1 µm and 100 µm, and for two texture features the respective diameter is indicated. The scale is indicated at the top right.

Figure 3A:
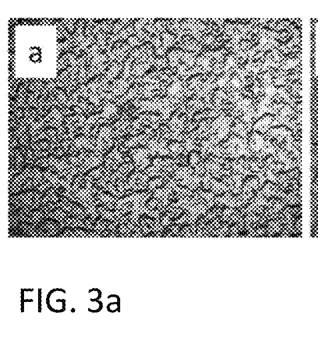
FIGS. 3a-3c show photographs of etched surfaces of glass articles.
Figure 3B:
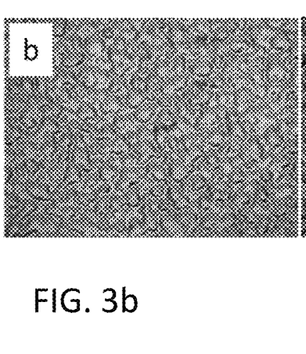
Figure 3C:
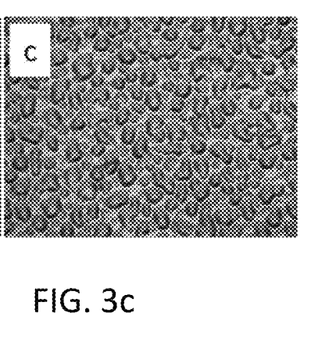

FIGS. 3a-3c show photographs of etched surfaces of glass articles according to embodiments. The surfaces were etched for different lengths of time. The sample in FIG. 3a results from the etching step being performed for 60 seconds, in FIG. 3b for 150 seconds, and in FIG. 3c for 300 seconds.

Figure 4A:
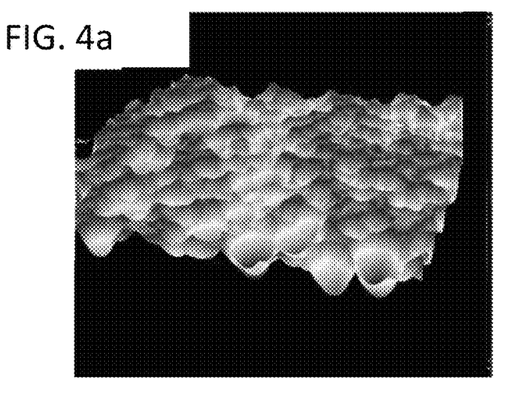
FIGS. 4a-4f show views of surface topographies of glass articles as obtained by white light interferometry in each case.
Figure 4B:
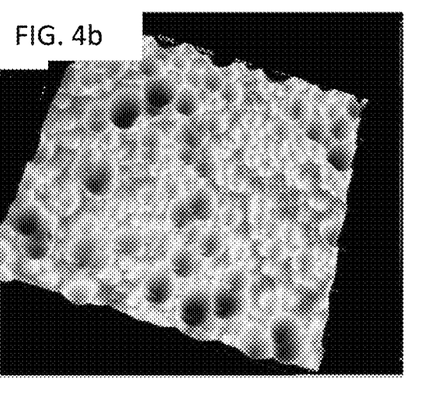

Finally, FIGS. 4a-4f shows a comparison of surface topographies of commercially available surfaces of glass articles as obtained by wet chemical etching (FIGS. 4a and 4b) exhibiting rather large irregular texture features, in particular comprising circular or spherical dome-shaped dents. FIGS. 4a and 4b were obtained for a measured area of 0.336*0.336 mm$^2$, whereby the same area was measured in each case, but view FIG. 4b is slightly tilted in comparison to FIG. 4a, in order to represent the topography more distinctively.

Figure 4C:
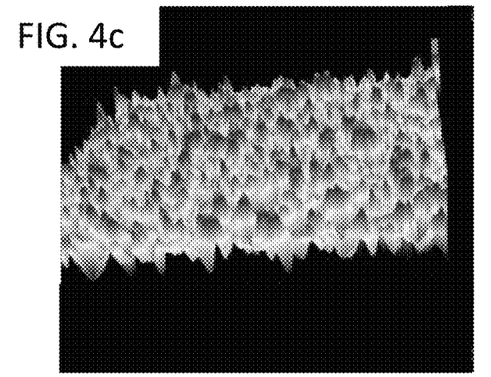
Figure 4D:
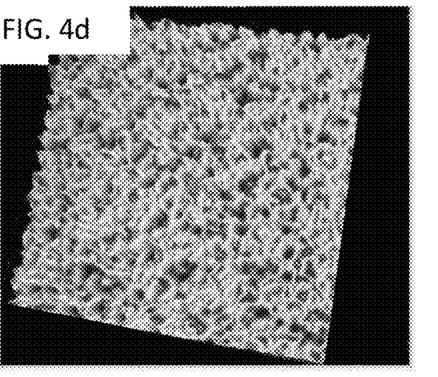

By contrast, surface topographies FIGS. 4c and 4d exhibit significantly finer and more evenly distributed texture features. FIGS. 4c and 4d were obtained for a measured area of 0.336*0.336 mm$^2$, whereby the same area was measured in each case, but FIG. 4d is slightly tilted in comparison to FIG. 4c, in order to represent the topography more distinctively.

Figure 4E:
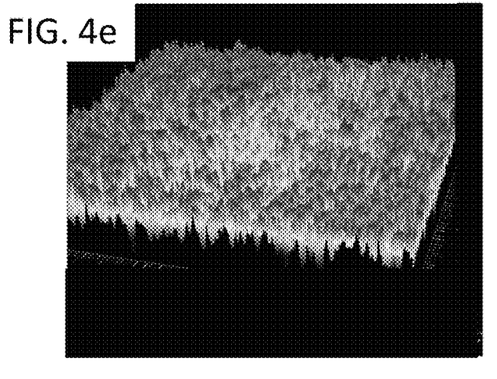
Figure 4F:
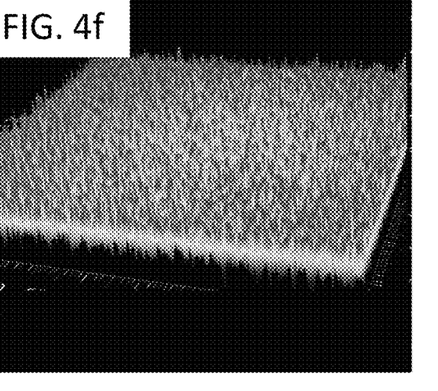

Finally, FIGS. 4e and 4f show measurements of surface topographies in the at least one area.

The surfaces or parameters characterizing the surfaces were determined in each case on a surface area of 0.336*0.336 mm$^2$ (FIG. 4 a-d) or for a larger surface area of 1.6*1.6 mm$^2$ (FIGS. 4e and 4f).

This difference between the illustrated surfaces of embodiments of the glass article can be seen from the surfaces of FIGS. 4c and 4d, as shown here by way of example, have an Ssk of greater than 0, preferably greater than 1, and a ratio of Spk to Svk equal to 1±0.1, determined for the at least one surface within a measured surface area of more than 0.1 mm$^2$ and less than 3 mm$^2$.

Measured values of surface parameters that further demonstrate the differences in topographies are shown in the tables below.

For an exemplary sample which is wet-chemically etched and has the typical structures obtained by wet chemical etching, and for a typical sample according to one embodiment of the present disclosure, the following values are obtained for the at least one area of the at least one surface:

| Size of measured surface area | 1.6*1.6 mm$^2$ (FIG. 4 e) | 0.33*0.33 mm$^2$ (FIG. 4 a, b) | 1.6*1.6 mm$^2$ (FIG. 4 f) | 0.33*0.33 mm$^2$ (FIG. 4 c, d) |
|---|---|---|---|---|
| Sk (nm) | 565 | 551 | 750 | 605 |
| Spk (nm) | 148 | 70 | 301 | 226 |
| Svk (nm) | 310 | 335 | 290 | 212 |
| Spk/Svk | 0.48 | 0.21 | 1.04 | 1.07 |

This effect of the difference in the measured values or values for characterizing the surface in the at least one area of the at least one surface is thereby shown to be independent of the size of the examined area, as can be seen from the above measurements by way of example.

The skewness of the surface of the reference sample as well as of the at least one region of the at least one surface according to the present application also differs, as can be seen from the following comparison:

| Prior art (Ssk) | Embodiment of present disclosure (Ssk) |
|---|---|
| −0.2 to −0.9 | 0.03 to 0.13 |

Ssk refers to the skewness of the surface area as it is defined above.

In other words—as can also be seen from the surface topographies depicted in FIGS. 4a-4f—the surface structures of samples according to the prior art are dominated by "valley structures" or depressions, whereas the samples obtained according to embodiments of the present disclosure have a different configuration in the at least one area of the at least one surface, namely, as exemplified by the above measurement, dominated by peaks. This also applies independently of the size of the examined measured area. However, these are always smaller than 0 regardless of the size of the measurement area. In contrast, for the embodiments according to the present disclosure, values in the range between 0.03 and 0.13 are obtained, i.e.,—regardless of the size of the measured area—always values greater than 0.

Finally, the following table shows the parameter Sdq and the roughness RMS in the at least one region of the at least one surface:

| Size of measured surface area | 1.6*1.6 mm$^2$ | 0.33*0.33 mm$^2$ | 1.6*1.6 mm$^2$ | 0.33*0.33 mm$^2$ |
|---|---|---|---|---|
| Sdq (µm/mm) | 55 | 34 | 108 | 81 |
| Roughness RMS (nm) | 231 | 232 | 298 | 235 |

In other words, the root mean square gradient of the surface topographies according to embodiments of the present disclosure in the at least one region of the at least one surface is greater than for surface topographies obtained by known methods. This is because the structures according to embodiments of the present disclosure are laterally narrower.

The above measurement values were obtained in accordance with ISO 25178 for three-dimensional surface profiles or in accordance with ISO 13565-2, which describes analogous values for essentially two-dimensional sections.

For larger surface areas, i.e., of 1.6*1.6 mm$^2$, corresponding views of the surface topographies can be found in FIGS. 4e and 4f.

Figure 5:
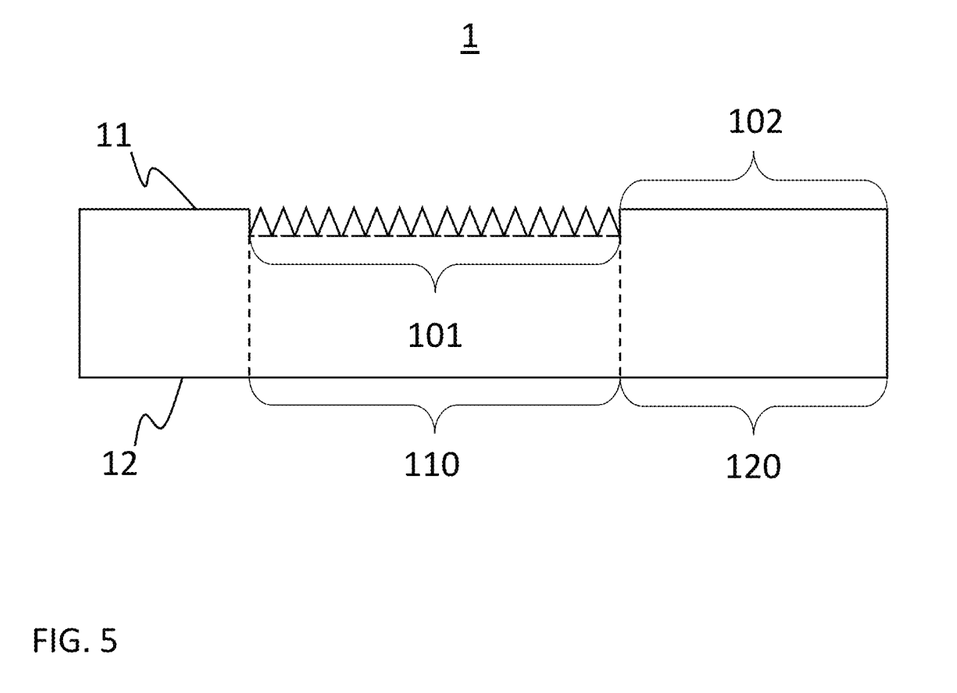
FIG. 5 is a schematic diagram of a glass article according to one embodiment, not drawn to scale.

Finally, FIG. 5 shows a schematic diagram of a sheet-like glass article 1 according to one embodiment, not drawn to scale.

Here, the glass article 1 comprises two main faces or surfaces 11 and 12 which may also be considered as an upper surface (surface 11) and a lower surface (surface 12), here. Surface 11 includes an area 101 with a roughness RMS from 10 nm to 1000 nm, preferably a DOI from 30 to 70, a gloss value of more than 40 at a viewing angle of 60°. In a portion 110 which includes the area 101 of the at least one surface 11, the glass article has a haze value, determined in transmission, of less than 3%.

The ratio of Spk to Svk, determined for the at least one area 101 of the at least one surface 11, is equal to 1±0.1 within a measured surface area of more than 0.1 mm² and less than 3 mm², and/or the Ssk value, determined for the at least one area 101 of the at least one surface 11 of the glass article 1 is greater than 0, preferably determined within a measured surface area of more than 0.1 mm² and less than 3 mm², and/or the root mean square gradient value, Sdq, of the at least one area 101 of the at least one surface 11 is at least 50 µm/mm, preferably at least 75 µm/mm over a surface area of 0.33 mm*0.33 mm, and/or is at least 70 µm/mm, preferably at least 90 µm/mm, and most preferably at least 100 µm/mm over a surface area of 1.6 mm*1.6 mm.

The glass article 1 includes at least one further area 102 on the surface 11, in which the glare of the surface was not reduced and where, consequently, special surface features or surface topographies or surface texture as in area 101 were not produced.

The glass article 1 thus comprises a portion 110 in which at least one surface 11, 12 includes an area 101 in which a special surface texture has been produced, and a portion 120 in which no such surface texture has been produced.

LIST OF REFERENCE NUMERALS

1 Glass article
11, 12 Surfaces or main surfaces of the glass article
101, 102 Surface areas of the glass article
110, 120 Portions of the glass article

What is claimed is:

1. A sheet-like glass article, comprising:
   a surface with an area having a roughness RMS from 10 nm to 1000 nm, a distinctness of image DOI from 30 to 70, a gloss value of less than 40 at a viewing angle of 60°, and a haze value, determined in transmission, of less than 3%; and
   a ratio of mean height of peaks above core surface (Spk) to mean depth of valleys below core surface (Svk) determined for the area that is equal to 1±0.1 within a measured surface area of more than 0.1 mm² and less than 3 mm².

2. The article of claim 1, wherein the area further comprises a skewness value (Ssk) that is greater than 0 determined within the measured surface area.

3. The article of claim 1, wherein the area further comprises a root mean square gradient value (Sdq) that is at least 50 µm/mm over a surface area of 0.33 mm*0.33 mm.

4. The article of claim 3, wherein the root mean square gradient value (Sdq) is at least 75 µm/mm over the surface area of 0.33 mm*0.33 mm.

5. The article of claim 3, wherein the root mean square gradient value (Sdq) is at least 70 µm/mm over an area of 1.6 mm*1.6 mm.

6. The article of claim 3, wherein the root mean square gradient value (Sdq) is at least 100 µm/mm over an area of 1.6 mm*1.6 mm.

7. The article of claim 1, wherein the area has a surface topography configured so that a skewness or asymmetry (Ssk) is greater than 0.

8. The article of claim 7, wherein the skewness or asymmetry (Ssk) is more than 1.

9. The article of claim 1, further comprising a sparkle, as determined for a display having 190 DPI, of less than 0.1.

10. The article of claim 9, wherein the sparkle is at most 0.09.

11. The article of claim 1, wherein the glass article is toughened.

12. The article of claim 1, wherein the glass article is chemically toughened.

13. The article of claim 1, further comprising a thickness between 0.1 mm and 8 mm.

14. The article of claim 1, wherein the glass article comprises glass comprising, in wt %:
   $SiO_2$ 50 to 80,
   $Al_2O_3$ 0 to 30,
   $B_2O_3$ 0 to 20,
   $Li_2O$ 0 to 15,
   $Na_2O$ 0 to 20,
   $K_2O$ 0 to 20,
   CaO 0 to 15,
   BaO 0 to 10.

* * * * *